United States Patent
Kusama et al.

(10) Patent No.: US 9,034,500 B2
(45) Date of Patent: May 19, 2015

(54) LAMINATED ELECTRODE-TYPE BATTERY, MANUFACTURING METHOD THEREFOR, VEHICLE, AND DEVICE

(75) Inventors: Kazuyuki Kusama, Nagaoya (JP); Kiyomi Kozuki, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 245 days.

(21) Appl. No.: 13/638,630

(22) PCT Filed: Apr. 2, 2010

(86) PCT No.: PCT/JP2010/056061
§ 371 (c)(1),
(2), (4) Date: Oct. 1, 2012

(87) PCT Pub. No.: WO2011/125151
PCT Pub. Date: Oct. 13, 2011

(65) Prior Publication Data
US 2013/0022849 A1    Jan. 24, 2013

(51) Int. Cl.
*H01M 4/64* (2006.01)
*H01M 4/66* (2006.01)
(Continued)

(52) U.S. Cl.
CPC .............. *H01M 2/263* (2013.01); *H01M 2/34* (2013.01); *H01M 10/0431* (2013.01); *Y02T 10/7011* (2013.01); *H01M 4/661* (2013.01); *H01M 10/0422* (2013.01); *H01M 10/0525* (2013.01)

(58) Field of Classification Search
CPC ........... H01M 4/64; H01M 4/66; H01M 2/10; H01M 10/04
USPC .............. 429/96, 211, 161, 178, 231.95, 122; 29/623.1, 623.5
See application file for complete search history.

(56) References Cited

U.S. PATENT DOCUMENTS

| | | | |
|---|---|---|---|
| 6,761,993 B1 * | 7/2004 | Karasawa et al. ............. | 429/161 |
| 2003/0143460 A1 | 7/2003 | Yoshida et al. | |

(Continued)

FOREIGN PATENT DOCUMENTS

| | | |
|---|---|---|
| JP | 2000-200589 | 7/2000 |
| JP | 2000-200596 | 7/2000 |

(Continued)

OTHER PUBLICATIONS

Machine Translation of: Inoue et al. (JP 2000/200589), Jul. 18, 2000.*

*Primary Examiner* — Kenneth Douyette
(74) *Attorney, Agent, or Firm* — Finnegan, Henderson, Farabow, Garrett & Dunner, LLP

(57) ABSTRACT

Provided are a laminated electrode-type battery having high joint strength and mechanical strength around a connecting portion between a positive-electrode current collector and a positive-electrode core member and around a connecting portion between a negative-electrode current collector and a negative-electrode core member, a manufacturing method therefor, a vehicle, and a device. The leading end of a positive-electrode core member and a positive-electrode current collector are joined by a connecting material. The melting point of the connecting material for positive-electrode is lower than that of the positive-electrode core member. Meanwhile, the leading end of a negative-electrode core member and a negative-electrode current collector are joined by a connecting material. The melting point of the connecting material for negative-electrode is lower than that of the negative-electrode core member.

14 Claims, 11 Drawing Sheets

(51) Int. Cl.
*H01M 2/10* (2006.01)
*H01M 10/04* (2006.01)
*H01M 2/26* (2006.01)
*H01M 2/34* (2006.01)
*H01M 10/0525* (2010.01)

(56) References Cited

U.S. PATENT DOCUMENTS

2005/0106455 A1* 5/2005 Yoshida et al. ............... 429/178
2005/0260489 A1* 11/2005 Kim ............................. 429/122
2008/0038639 A1* 2/2008 Ohata et al. .............. 429/231.95

FOREIGN PATENT DOCUMENTS

| | | |
|---|---|---|
| JP | 2001-160387 | 6/2001 |
| JP | 2001-266899 | 9/2001 |
| JP | 2003-223875 | 8/2003 |
| JP | 2004-6407 | 1/2004 |
| JP | 2004-119330 | 4/2004 |
| JP | 2004-139898 | 5/2004 |
| JP | 2004-158394 | 6/2004 |
| WO | WO 2009/110250 A1 | 9/2009 |

* cited by examiner

LAMINATED ELECTRODE-TYPE BATTERY, MANUFACTURING METHOD THEREFOR, VEHICLE, AND DEVICE

CROSS-REFERENCE TO RELATED APPLICATIONS

This application is a national phase application of International Application No. PCT/JP2010/056061, filed Apr. 2, 2010, the content of which is incorporated herein by reference.

TECHNICAL FIELD

The present invention relates to a laminated electrode-type battery, a method of manufacturing the battery, a vehicle, and a device. More particularly, the present invention relates to a laminated electrode-type battery with high mechanical strength in a connecting portion between a positive current collecting plate and a positive electrode core member and a connecting portion between a negative current collecting plate and a negative electrode core member, a method of manufacturing the battery, a vehicle, and a device.

BACKGROUND ART

Secondary batteries are utilized in various fields, for example, electronic devices such as cellular phones and personal computers, vehicles such as hybrid vehicles and electric vehicles, and others. Each of such secondary batteries includes a positive electrode plate(s), a negative electrode plate(s), and electrolyte. Separators are commonly provided between the positive electrode plate(s) and the negative electrode plate(s) for their insulation from each other.

The shapes of those batteries are, for example, cylindrical, rectangular, and so on. Electrode bodies used in those batteries include a wound-type electrode body in which a positive electrode plate and a negative electrode plate are laminated and wound in spiral form and a flat-laminated-type electrode body in which positive electrode plates and negative electrode plates are laminated flatly. For current collection from those laminated-type electrode bodies, the following method is conceived. A positive electrode core member is placed to protrude in one direction and its protruding portion is joined to a positive current collecting plate. Similarly, a negative electrode core member is placed to protrude in the other direction and its protruding portion is joined to a negative current collecting plate.

This joining is conducted by welding or the like, thereby providing mechanical connection and electrical connection. Such joined portions need to have joint strength and mechanical strength. In case the joined portions are partially peeled or broken away or in case the joined portions or their surroundings are broken down, such defective sites could not be fixed and lose the electric connection itself. This loss of electric connection disables current collection therefrom. The joined portions also need to have low electrical resistance, for the reason that energy loss becomes large as the electrical resistance is high.

Under the above circumstances, a technique to improve the mechanical strength of the joined portions has been developed. For example, Patent Document 1 discloses a secondary battery including a wound electrode body in which an end portion of the protruding portion of the positive electrode core member or negative electrode core member is slightly curved or bent, forming a burr. It is disclosed that this bun contributes to preventing the end portion of the protruding portion from becoming buckled or bent by pressure applied during welding, so that welding failures are avoided.

On the other hand, a technique to reduce electrical resistance has been developed. For example, Patent Document 2 discloses a cylindrical storage battery in which a positive current smoothing plate is welded to an end portion of a positive electrode core member and a negative current smoothing plate is welded to an end portion of a negative electrode core member. It is disclosed that those smoothing plates contribute to reducing internal resistance of the secondary battery and thus preventing sudden drop of voltage even when a large amount of current is supplied to the secondary battery.

RELATED ART DOCUMENTS

Patent Documents

Patent Document 1: JP-A-2001-266899
Patent Document 2: JP-A-2004-139898

SUMMARY OF THE INVENTION

Problems to be Solved by the Invention

However, when the end portion of the positive or negative electrode core member is welded to the positive or negative current collecting plate, the welded end portion becomes thinner than before welding. This is because the end portion temporarily melts by heat during welding. The mechanical strength of a thin portion in such an electrically conductive region is lower than that of other portions thicker than the relevant thin portion. Furthermore, electrical resistance of the thin portion in a current path is higher than that of other portions. Thus, the thin portion is likely to lose large electrical energy. This problem could not be solved by such a configuration that the protruding portion of the positive or negative electrode core member is bent to form a burr as in Patent Document 1 or the smoothing plates are placed as in Patent Document 2.

The present invention has been made to solve the above problems and has a purpose to provide a laminated electrode-type battery with high joint strength and high mechanical strength in a connecting portion and its surrounding portion between a positive current collecting plate and a positive electrode core member and a connecting portion and its surrounding portion between a negative current collecting plate and a negative electrode core member, a method of manufacturing the battery, a vehicle, and a device.

Means of Solving the Problems

To achieve the above purpose, one aspect of the invention provides a laminated electrode-type battery comprising: a laminated electrode body including: a positive electrode plate in which a positive electrode core member is formed, on a part of at least one surface, with a positive electrode mixture layer; a negative electrode plate in which a negative electrode core member is formed, on a part of at least one surface, with a negative electrode mixture layer; and separators interposed between the positive electrode plate and the negative electrode plate, the positive electrode plate, negative electrode plate, and separators being laminated so that a remaining part of the positive electrode core member and a remaining part of the negative electrode core member protrude in different directions from each other; a positive current collector joined to an end portion of the positive electrode core member protruding from the positive electrode plate of the laminated electrode body; and a negative current collector joined to an end portion of the negative electrode core member protruding from the negative electrode plate of the laminated electrode body, wherein the laminated electrode-type battery comprises: a positive electrode connecting material that connects the end portion of the positive electrode core member and the positive current collector; and a negative electrode connecting material that connects the end portion of the negative electrode core member and the negative current collector, a melting point of the positive electrode connecting material is lower than a melting point of the positive electrode core member, and a melting point of the negative electrode connecting material is lower than a melting point of the negative electrode core member. In the above laminated electrode-type battery, there is little possibility of peeling of the positive electrode core member from the positive current collector at the joining portion. Furthermore, the positive electrode core member around the connecting portion has sufficient mechanical strength. The same applies to the negative electrode.

In the above laminated electrode-type battery, preferably, the melting point of the positive electrode connecting material is lower than a melting point of the positive current collector, and the melting point of the negative electrode connecting material is lower than a melting point of the negative current collector. This is because the positive current collector near the positive electrode connecting material provides sufficient mechanical strength. The same applies to negative electrode.

In the above laminated electrode-type battery, the positive electrode core member is made of aluminum, the negative electrode core member is made of copper, the positive electrode connecting material is made of a brazing material selected from Al—Si-based brazing material, Al—Si—Mg-based brazing material, Al—Zn-based brazing material, and Zn—Sn-based brazing material, and the negative electrode connecting material is made of a brazing material selected from Ni-based brazing material, Ag-based brazing material, and Cu-based brazing material. Accordingly, there is an advantageous effect that the positive current collector and the positive electrode core member are joined with sufficient joint strength by the brazing material wet-spread by brazing.

In the above laminated electrode-type battery, preferably, the positive current collector is made of aluminum, the negative current collector is made of copper. Accordingly, the positive current collector and the positive electrode core member are joined with sufficient joint strength by the brazing material wet-spread by brazing.

In the above laminated electrode-type battery, preferably, a non-aqueous electrolyte is provided between the positive electrode plate and the negative electrode plate.

In the above laminated electrode-type battery, preferably, a difference between the thickness of the end portion of the positive electrode core member and the thickness of a portion of the positive electrode core member on which the positive electrode mixture layer is formed is in a range of 12% of the thickness of the portion of the positive electrode core member on which the positive electrode mixture layer is formed. Thus, the positive electrode core member is less likely to be broken at its end.

In the above laminated electrode-type battery, preferably, a difference between the thickness of the end portion of the negative electrode core member and the thickness of a portion of the negative electrode core member on which the negative electrode mixture layer is formed is in a range of 3% of the thickness of the portion of the negative electrode core member on which the negative electrode mixture layer is formed. Thus, the negative electrode core member is less likely to be broken at its end.

In the above laminated electrode-type battery, preferably, a melting point of the negative electrode connecting material is higher than a melting point of the positive electrode core member.

In the above laminated electrode-type battery, preferably, a melting point of the negative electrode connecting material is higher than a melting point of the positive current collector.

Furthermore, another aspect of the invention provides a vehicle that mounts the above laminated electrode-type battery.

Still another aspect of the invention provides a device that mounts the above laminated electrode-type battery.

Moreover, another aspect of the invention provides a method of manufacturing a laminated electrode-type battery, in which a laminated electrode body is produced by laminating a positive electrode plate in which a part of at least one surface of a positive electrode core member is formed with a positive electrode mixture layer, a negative electrode plate in which a part of at least one surface of a negative electrode core member is formed with a negative electrode mixture layer, and separators interposed between the positive electrode plate and the negative electrode plate, so that a remaining part of the positive electrode core member and a remaining part of the negative electrode core member protrude in different directions from each other; an end portion of the negative electrode core member protruding from the negative electrode plate of the laminated electrode body is joined to a negative current collector, and an end portion of the positive electrode core member protruding from the positive electrode plate of the laminated electrode body is joined to a positive current collector, wherein the positive electrode core member is made of aluminum, the negative electrode core member is made of copper, wherein the end portion of the positive electrode core member and the positive current collector are joined by using a brazing material for positive electrode which has a lower melting point than a melting point of the positive electrode core member, the brazing material for positive electrode being one of Al—Si-based brazing material, Al—Si—Mg-based brazing material, Al—Zn-based brazing material, and Zn—Sn-based brazing material, and the end portion of the negative electrode core member and the negative current collector are joined by using a brazing material for negative electrode which has a lower melting point than a melting point of the negative electrode core member, the brazing material for negative electrode being one of Ni-based brazing material, Ag-based brazing material, and Cu-based brazing material. According to the method of manufacturing the above laminated electrode-type battery, there is little possibility that the positive electrode core member melts during joining between the positive electrode core member and the positive current collector. Furthermore, the brazing material is sufficiently wet-spread during joining. Accordingly, the joined portion of the manufactured laminated electrode-type battery is not likely to peel off. In addition, the positive electrode core member has sufficiently high mechanical strength. The same applies to the negative electrode.

In the above method of manufacturing a laminated electrode-type battery, preferably, the brazing material for positive electrode is a brazing material having a melting point lower than a melting point of the positive current collector, and the brazing material for negative electrode is a brazing material having a melting point lower than a melting point of the negative current collector. This is because the positive current collector and the negative current collector exhibit high mechanical strength. In the above method of manufacturing a laminated electrode-type battery, further preferably, the positive electrode core member is joined to the positive current collector after the negative electrode core member is joined to the negative current collector, and the brazing material for negative electrode is a material having a melting point higher than a melting point of the positive electrode core member. Furthermore, it is preferable that the brazing material for negative electrode is a material having a melting point higher than a melting point of the positive current collector.

Effects of the Invention

According to the invention, there are provided a laminated electrode-type battery with high joint strength and mechanical strength in a connecting portion and its surrounding portion between a positive current collecting plate and a positive electrode core member and a connecting portion and its surrounding portion between a negative current collecting plate and a negative electrode core member, a method of manufacturing the battery, a vehicle, and a device.

DESCRIPTION OF THE REFERENCE SIGNS

100 Battery
101 Battery container
102 Lid
110 Positive current collecting plate
120 Negative current collecting plate
200 Electrode wound body
111, 121, 311, 321 Connecting material
P Positive electrode plate
PA Positive electrode mixture layer
PB Positive electrode core member
P1 Positive electrode coated part
P2 Positive electrode uncoated part
N Negative electrode plate
NA Negative electrode mixture layer
NB Negative electrode core member
N1 Negative electrode coated part
N2 Negative electrode uncoated part
M Electrode main part
S, T Separator

MODE FOR CARRYING OUT THE INVENTION

A detailed description of a preferred embodiment of the present invention will now be given referring to the accompanying drawings. In the present embodiment, the invention is embodied as a cylindrical lithium ion secondary battery.

1. Cylindrical Secondary Battery

Figure 1:
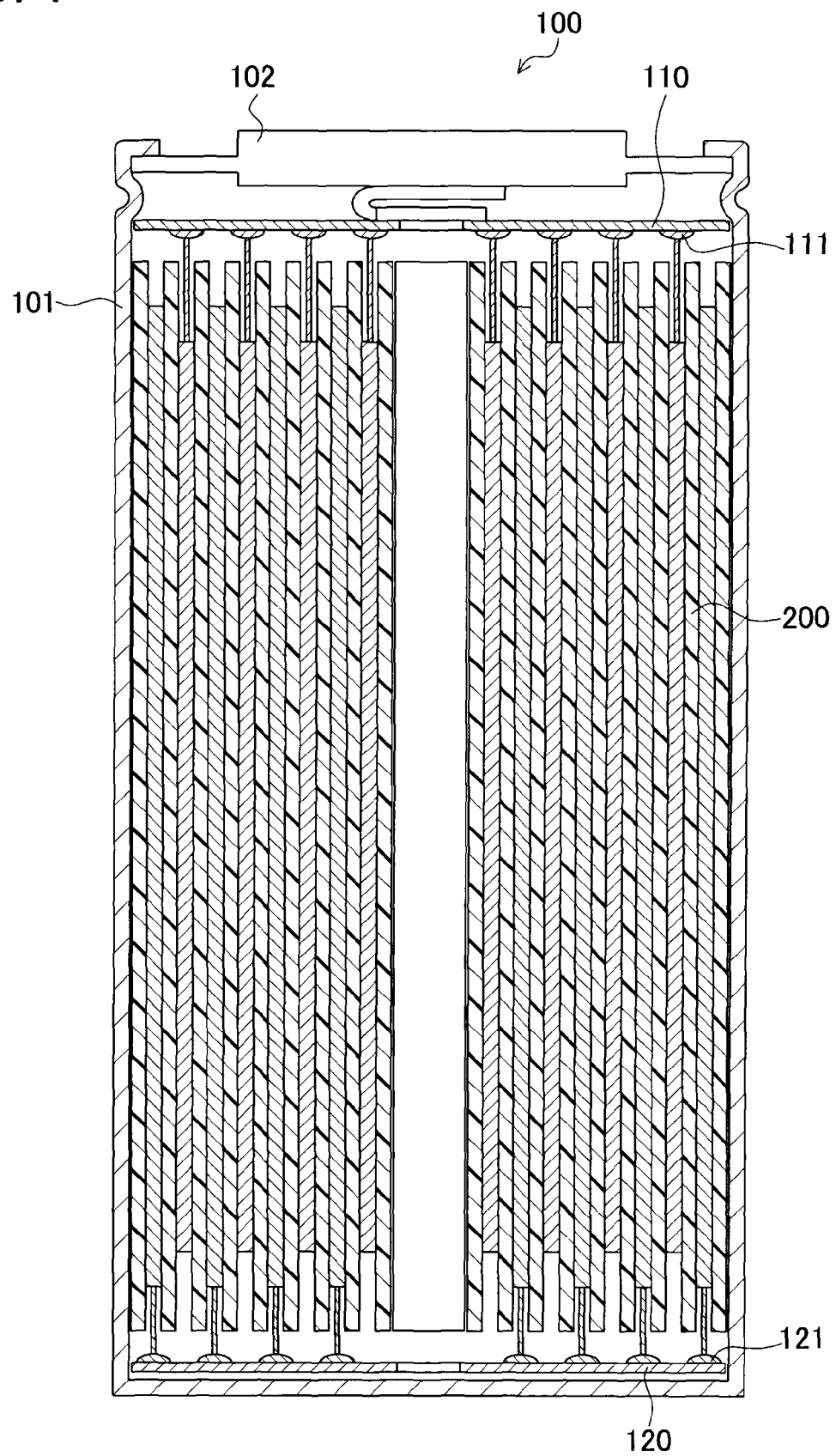
FIG. 1 is a cross sectional view to explain an inner structure of a battery in an embodiment.

A battery in this embodiment is a cylindrical lithium ion secondary battery. Specifically, it is a laminated electrode-type battery including a laminated electrode body produced by winding a positive electrode plate and a negative electrode plate in an alternately laminated state. FIG. 1 is a cross sectional view of a battery 100 in the present embodiment. The battery 100 includes, as shown in FIG. 1, an electrode wound body 200, a positive current collecting plate 110, and a negative current collecting plate 120 which are contained in a battery container 101 sealed by a lid 102. The positive current collecting plate 110 is joined to the electrode wound body 200 with connecting materials 111. The negative current collecting plate 120 is joined to the electrode wound body 200 with connecting materials 121. Those connecting materials 111 and 121 will be mentioned in detail later. The battery container 101 also contains electrolytic solution injected therein.

The electrode wound body 200 repeats charge and discharge in the electrolytic solution, thereby directly contributing to generation of electrical power. The positive current collecting plate 110 is a positive current collector for collecting the electric power from the electrode wound body 200 or releasing electric power to the electrode wound body 200. The positive current collecting plate 110 is made of aluminum. The negative current collecting plate 120 is a negative current collector for collecting the electric power from the electrode wound body 200 or releasing electric power to the electrode wound body 200. The negative current collecting plate 120 is made of copper.

The electrolytic solution injected in the battery container 101 is prepared by dissolving electrolyte in an organic solvent. For example, the organic solvent may include ester solvents such as propylene carbonate (PC), ethylene carbonate (EC), dimethyl carbonate (DMC), and ethyl methyl carbonate (EMC), and organic solvents prepared by mixing an ether solvent or the like, such as γ-butyrolacton (γ-BL) and diethoxyethane (DEE), to an ester solvent. A salt used as the electrolyte may be selected from lithium salts such as lithium perchlorate (LiClO$_4$), lithium fluoroborate (LiBF$_4$), and lithium hexafluorophosphate (LiPF$_6$).

2. Electrode Wound Body

Figure 2:
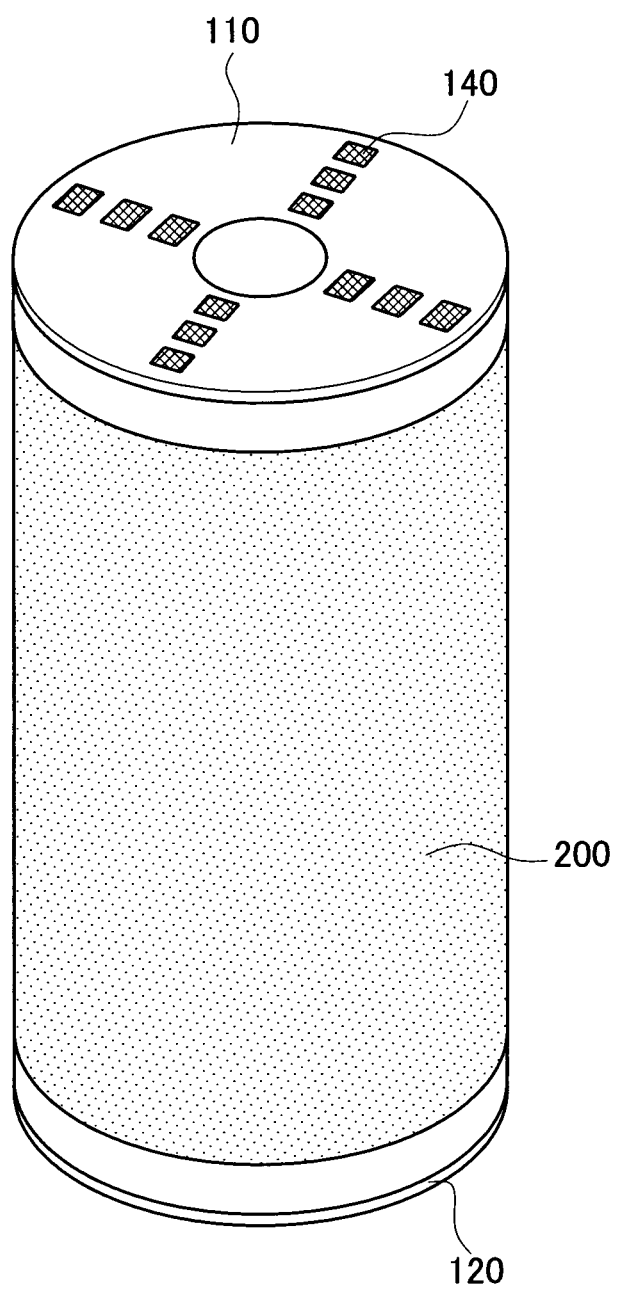
FIG. 2 is a perspective view showing only an electrode wound body, a positive current collecting plate, and a negative current collecting plate of the battery in the embodiment.

FIG. 2 is a perspective view showing only the electrode wound body 200, positive current collecting plate 110, and negative current collecting plate 120 of the battery 100 in the present embodiment. In FIG. 2, regions 140 in which the positive current collecting plate 110 is joined to the electrode wound body 200 are illustrated with hatching. The connecting materials 111 shown in FIG. 1 are present in the positions corresponding to the regions 140 on an inner surface of the positive current collecting plate 110, that is, the surface facing the electrode wound body 200. On the negative current collecting plate 120, similarly, the connecting materials 121 are present in the positions substantially facing the connecting materials 111 provided on the positive current collecting plate 110.

Figure 3:
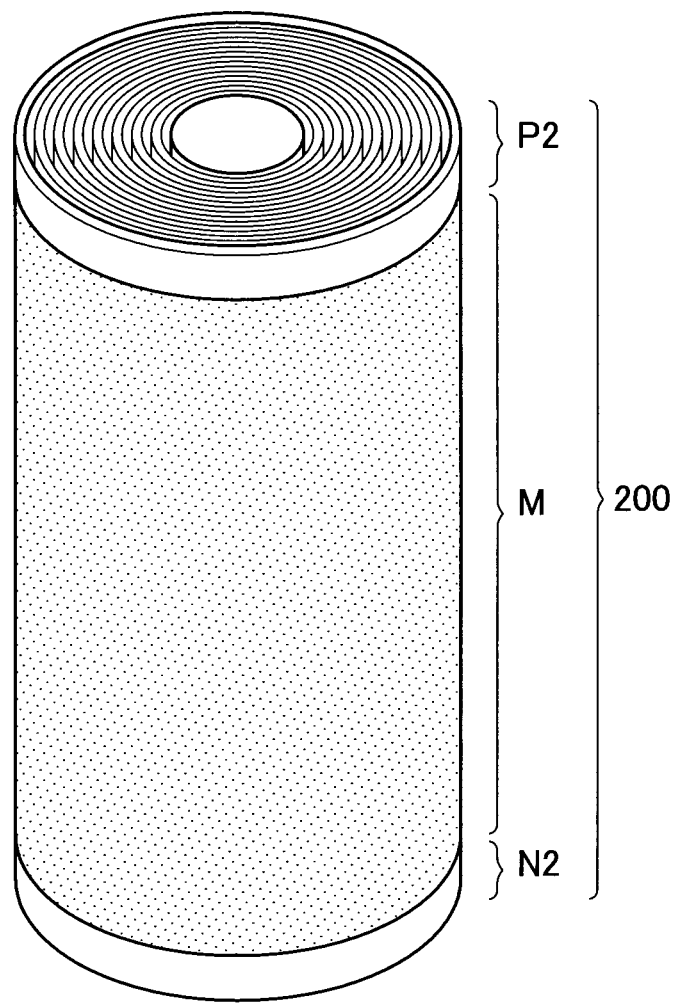
FIG. 3 is a perspective view to explain the electrode wound body of the battery in the embodiment.

FIG. 3 is a perspective view of the electrode wound body 200. As shown in FIG. 3, the electrode wound body 200 consists of an electrode main part M provided at the center, and a positive electrode uncoated part P2 and a negative electrode uncoated part N2 located at both ends. The electrode main part M is a portion in which the positive electrode plate and the negative electrode plate are wound while interposing separators therebetween. The positive electrode uncoated part P2 and the negative electrode uncoated part N2 will be mentioned later.

The positive electrode plate is configured such that a strip-shaped positive electrode core member made of an aluminum foil is applied with a mixture containing a positive active material capable of absorbing and releasing lithium ions. The positive active material may include lithium composite oxides such as lithium nickel oxide ($LiNiO_2$), lithium manganese oxide ($LiMnO_2$), and lithium cobalt oxide ($LiCoO_2$). The negative electrode plate is configured such that a strip-shaped negative electrode core member made of a copper foil is applied with a mixture containing a negative active material capable of absorbing and releasing lithium ions. The negative active material may include carbonaceous matters such as amorphous carbon, hard-graphitized carbon, easy-graphitized carbon, and graphite.

Figure 4:
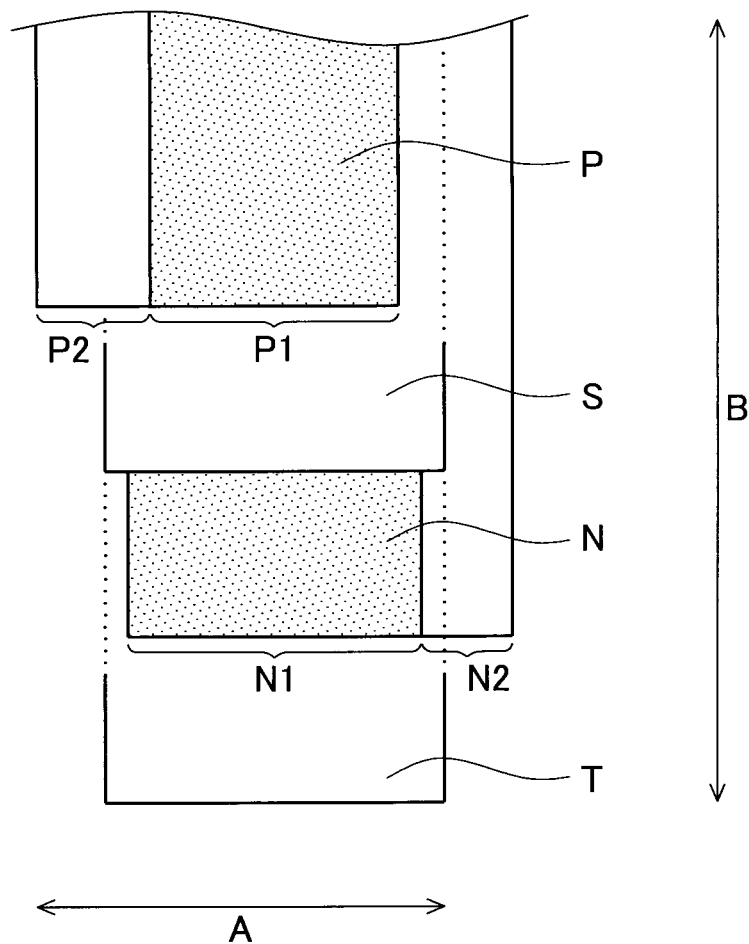
FIG. 4 is an exploded view to explain a winding structure of the electrode wound body of the battery in the embodiment.

FIG. 4 is an exploded view to show a winding structure of the electrode wound body 200. This electrode wound body 200 is produced by winding together a positive electrode plate P, a separator S, a negative electrode plate N, and a separator T which are laminated in this order from inside as shown in FIG. 4. Herein, the separator S and the separator T are made of the same material and merely assigned different signs S and T to clarify the above winding order.

The positive electrode plate P includes a positive electrode coated part P1 and the positive electrode uncoated part P2. The positive electrode coated part P1 is a part of a positive electrode core member whose both surfaces are applied with positive active material and others. The positive electrode uncoated part P2 is the remaining portion of the positive electrode core member, on which no positive active material and others are applied. Thus, the coated part P1 has a larger thickness than the uncoated part P2.

The negative electrode plate N includes a negative electrode coated part N1 and a negative electrode uncoated part N2. The negative electrode coated part N1 is a part of a negative electrode core member whose both surfaces are applied with negative active material and others. The negative electrode uncoated part N2 is the remaining portion of the negative electrode core member, on which no negative active material and others are applied. Thus, the coated part N1 has a larger thickness than the uncoated part N2.

In FIG. 4, an arrow A represents a width direction of the positive electrode plate P, negative electrode plate N, and separators S and T (a vertical direction in FIG. 3) and an arrow B represents a longitudinal direction of the positive electrode plate P, negative electrode plate N, and separators S and T (a lateral direction in FIG. 3). An application width of the positive electrode coated part P1 in the width direction is slightly narrower than the application width of the negative electrode coated part N1 in the width direction. This is to prevent an increase in concentration of lithium ions in the electrolytic solution by allowing the negative active material to more absorb the lithium ions when the concentration is high. If the lithium ion concentration in the electrolytic solution is too high, lithium may be deposited like dendrite. This deteriorates the battery performance.

Figure 5:
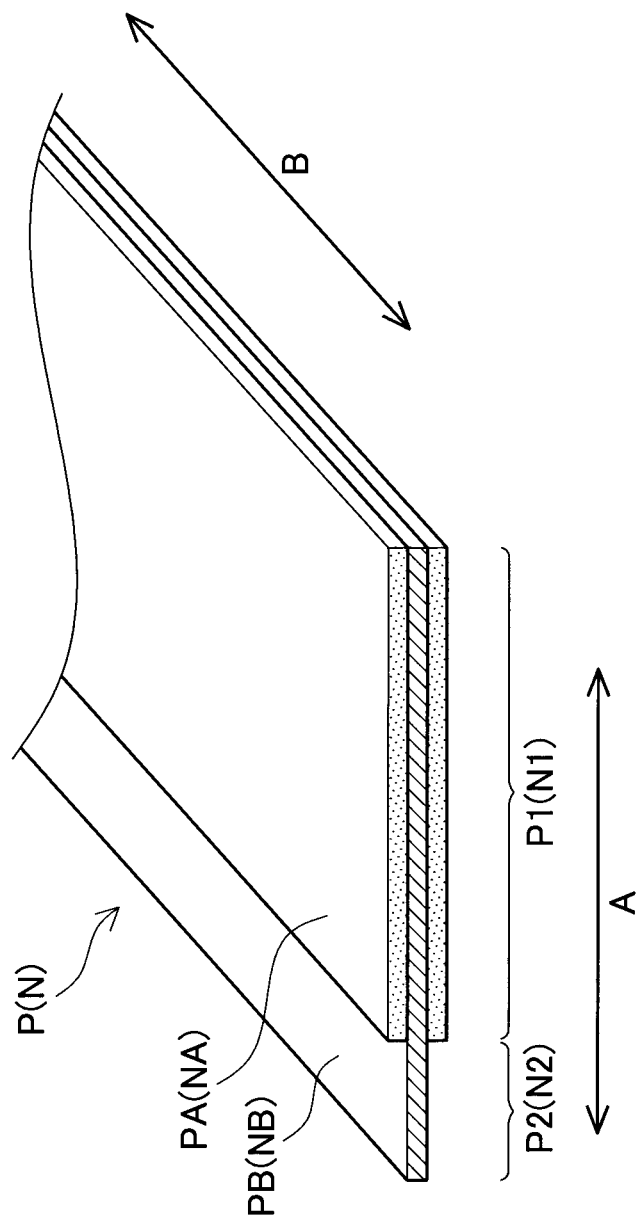
FIG. 5 is a perspective cross sectional view to explain a structure of a positive electrode plate or a negative electrode plate of the battery in the embodiment.

FIG. 5 is a perspective cross sectional view of the positive electrode plate P (or the negative electrode plate N). In FIG. 5, signs in front of parentheses denote parts of the positive electrode and signs in the parentheses denote parts of the negative electrodes. An arrow A in FIG. 5 indicates the same direction as that represented by the arrow A in FIG. 4, that is, the width direction of the positive electrode plate P. An arrow B in FIG. 5 indicates the same direction as that represented by the arrow B in FIG. 4, that is, the longitudinal direction of the positive electrode plate P.

As shown in FIG. 5, the positive electrode plate P is formed of a strip-shaped positive electrode core member PB and positive electrode mixture layers PA formed on both surfaces of the core member PB. In a left side in FIG. 5, the positive electrode uncoated part P2 of the positive electrode plate P protrudes in the width direction. This uncoated part P2 is formed in a strip shape. The positive electrode uncoated part P2 is a region on which no positive active material is applied. In the positive electrode uncoated part P2, therefore, the positive electrode core member PB remains bare and exposed. On the other hand, in a right side in FIG. 5, any protruding portion corresponding to the positive electrode uncoated part P2 is not formed. In the positive electrode coated part P1, the positive electrode mixture layers PA are formed with uniform thickness on both surfaces of the positive electrode core member PB.

The negative electrode plate N is formed of a strip-shaped negative electrode core member NB and negative electrode mixture layers NA formed on both surfaces of the core member NB as indicated in the parentheses in FIG. 5. As with the positive electrode, the negative electrode coated part N1 and the negative electrode uncoated part N2 are provided. However, the positive electrode plate P and the negative electrode plate N are wound by making the positive electrode uncoated part P2 and the negative electrode uncoated part N2 protrude on opposite sides as shown in FIG. 4.

Figure 6:
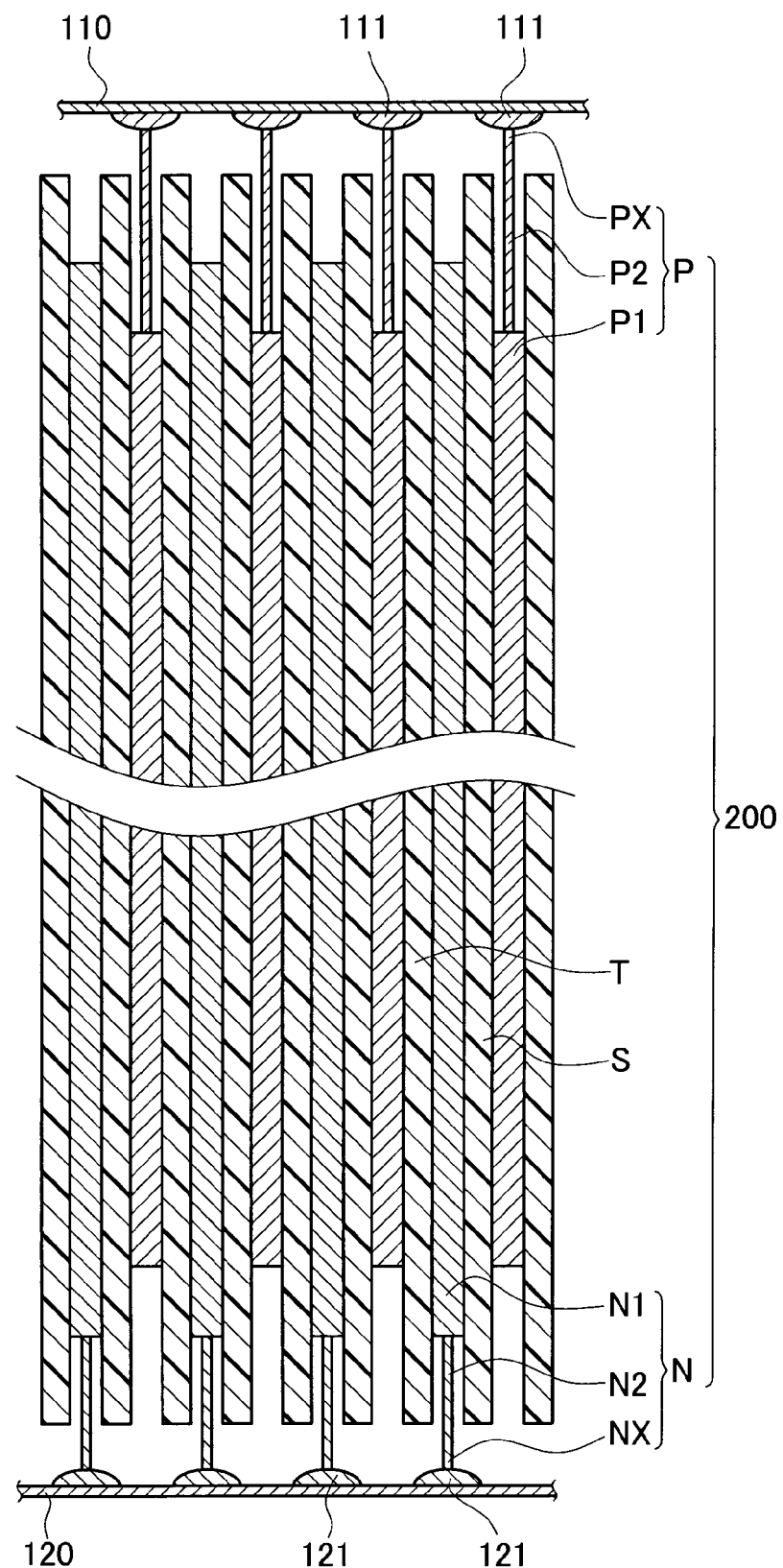
FIG. 6 is a cross sectional view (Example 1) to explain a connecting material for connecting a positive current collecting plate and a positive electrode core member or a connecting material for connecting a negative current collecting plate and a negative electrode core member of the battery in the embodiment.

3. Connecting Portions Between Electrode Plates and Electrode Current Collecting Plates FIG. 6 is a cross sectional view showing only around the electrode wound body 200 by removing the other parts from the battery 100 shown in FIG. 1. As shown in FIG. 6, the electrode wound body 200 is an electrode body in which the positive electrode plate P, the separator S, the negative electrode plate N, and the separator T are wound in this order. The positive current collecting plate 110 and the negative current collecting plate 120 are placed to face each other while interposing therebetween the electrode wound body 200.

In FIG. 6, the positive electrode coated part P1 and the negative electrode coated part N1 are hatched similarly with oblique lines. However, as shown in FIG. 4, the positive electrode coated part P1 is actually a portion of the aluminum positive electrode core member PB applied with a mixture containing the positive active material. On the other hand, the negative electrode coated part N1 is a portion of the copper negative electrode core member NB applied with a mixture containing the negative active material. Those hatching lines also represent the same meaning in FIGS. 1, 9, and 10.

An end portion PX of the positive electrode core member PB of the positive electrode uncoated part P2 is an end portion of the positive electrode core member PB protruding from the positive electrode coated part P1 toward the positive current collecting plate 110. The end portion PX of the positive electrode core member PB is joined to the positive current collecting plate 110 through the connecting materials 111 as described above. The connecting materials 111 are positive electrode connecting materials used to connect the end portion PX of the electrode core member PB to the positive current collecting plate 110. This joining is performed by brazing. Accordingly, the connecting materials 111 are mainly made of a brazing material. The kinds of this brazing material will be described in detail later.

A melting point of the connecting materials 111 is lower than a melting point of the positive electrode core member PB. Thus, the end portion PX of the positive electrode uncoated part P2 does not melt by heat in joining the end portion PX of the positive electrode uncoated part P2 and the positive current collecting plate 110, as described later. Furthermore, the melting point of the connecting materials 111 is lower than a melting point of the positive current collecting plate 110. Accordingly, a part of the positive current collecting plate 110 also does not melt by heat in brazing.

An end portion NX of the negative electrode core member NB of the negative electrode uncoated part N2 is an end portion of the negative electrode core member NB protruding from the negative electrode coated part N1 toward the negative current collecting plate 120 in a direction opposite from the protruding direction of the end portion PX of the positive electrode core member PB. The end portion NX of the negative electrode core member NB is joined to the negative current collecting plate 120 through the connecting materials 121 as described above. The connecting materials 121 are negative electrode connecting material used to connect the end portion NX of the negative electrode core member NB to the negative current collecting plate 120. This joining is performed by brazing. Accordingly, the connecting materials 121 are mainly made of a brazing material. The kind of this brazing material is different from the kind of the brazing material used for the positive electrode. The kinds of the brazing material will be described in detail later.

A melting point of this connecting materials 121 is lower than a melting point of the negative electrode core member NB. Thus, the end portion NX of the negative electrode uncoated part N2 does not melt by heat in joining the end portion NX of the negative electrode uncoated part N2 and the negative current collecting plate 120, as described later. Furthermore, the melting point of the connecting materials 121 is lower than a melting point of the negative current collecting plate 120. Accordingly, a part of the negative current collecting plate 120 also does not melt by heat in brazing.

The melting point of the connecting materials 111 on the positive electrode side may be higher or lower than the melting point of the negative current collecting plate 120 and the negative electrode uncoated part N2 on the negative electrode side. Furthermore, the melting point of the connecting materials 111 on the positive side may be higher or lower than the melting point of the connecting materials 121. In other words, there is no particular relevance. This is because the electrode wound body 200 has a sufficient width and hence negative-side parts are hardly heated when positive-side parts are heated. Similarly, the melting point of the connecting materials 121 on the negative electrode side may be higher or lower than the melting point of the positive current collecting plate 110 and the positive electrode uncoated part P2 on the positive electrode side. Furthermore, the melting point of the connecting materials 121 on the negative electrode side may be higher or lower than the melting point of the connecting materials 111. This is because positive-side parts are hardly heated when negative-side parts are heated.

During joining, as mentioned above, the positive electrode core member PB and the negative electrode core member NB do not melt. The thickness of the end portion PX of the positive electrode core member PB is therefore almost equal to the thickness of the positive electrode core member PB of the positive electrode coated part P1. The same applies to the negative electrode.

As described above, the battery 100 is configured such that the connecting materials 111 are provided between the positive electrode core member PB of the electrode wound body 200 and the positive current collecting plate 110 and the connecting materials 121 is provided between the negative electrode core member NB of the electrode wound body 200 and the negative current collecting plate 120. The melting point of the connecting materials 111 is lower than the melting point of the positive electrode core member PB. The melting point of the connecting materials 121 is lower than the melting point of the negative electrode core member NB.

The thickness of the positive electrode core member PB near the connecting materials 111 is almost equal to the thickness of the positive electrode core member PB in the positive electrode coated part P1. Therefore, the connecting materials 111 and the positive electrode core member PB near the connecting material 111 exhibit high mechanical strength. As with the positive electrode, the thickness of the negative electrode core member NB near the connecting materials 121 is almost equal to the thickness of the negative electrode core member NB in the negative electrode coated part N1.

4. Method of Manufacturing Battery

Herein, a method of manufacturing the battery 100 will be described. A joining step using the connecting materials 111 and 121 which are characteristic points of the invention will be explained in detail and other steps will be briefly explained.

A mixture containing a positive active material is first applied on both surfaces of the positive electrode core member PB and then dried. The dried positive electrode plate is press-cut into the positive electrode plate P. For the negative electrode, the negative electrode plate N is produced in a similar way. Subsequently, as shown in FIG. 4, the positive electrode plate P, separator S, negative electrode plate N, and separator T wound in this order from inside. The electrode wound body 200 is thus manufactured.

The negative current collecting plate 120 is joined to the electrode wound body 200. At that time, they are brazed with brazing material shown in Table 1. An example of nickel brazing filler metal is BNi-6 (JIS). An example of silver solder is BAg-8 (JIS). An example of copper phosphorus brazing filler metal is BCuP-2 (JIS). The brazing material is not limited to the above examples. Each of the brazing materials used herein has a melting point lower than the melting point of copper, 1357° C., used as the negative electrode core member NB. A solidus temperature of BNi-6 (JIS) is 875° C. A solidus temperature of BAg-8 (JIS) is 780° C. A solidus temperature of BCuP-2 (JIS) is 710° C. Accordingly, there is little possibility that the end portion NX of the negative electrode core member NB and a part of the negative current collecting plate 120 shown in FIG. 6 melt during the brazing.

TABLE 1

| | Negative Current Collecting Plate | Connecting Material (Negative Brazing Material) | Negative Uncoated Portion |
|---|---|---|---|
| Materials | Copper | Nickel Brazing Filler Metal<br>Silver Solder<br>Copper Phosphorus Brazing Filler Metal | Copper |

Subsequently, the positive current collecting plate 110 is joined to the electrode wound body 200. In this brazing, for example, a brazing material, A4047 (JIS), is used. A4047 (JIS) is an Al—Si alloy. In addition to this, the brazing materials shown in Table 2 are usable in the brazing. Each melting point of the brazing materials used herein is lower than the melting point of aluminum, 660° C., used as the positive electrode core member PB. For example, a melting temperature of A4047 (JIS) is about 577° C. Accordingly, there is little possibility that the end portion PX of the positive electrode core member PB and a part of the positive current collecting plate 110 shown in FIG. 6 melt during the brazing.

TABLE 2

| | Positive Current Collecting Plate | Connecting Material (Positive Brazing Material) | Positive Uncoated Portion |
|---|---|---|---|
| Materials | Aluminum | Al—Si Brazing Filler Metal<br>Al—Si—Mg Brazing Filler Metal<br>Al—Zn Brazing Filler Metal<br>Zn—Sn Brazing Filler Metal | Aluminum |

Herein, the necessary properties of the brazing materials other than the melting point are explained. The brazing material has to be selected from materials resistant to corrosion caused by an electrolytic solution while the brazing material is subjected to an electrical potential. In case corrosion is present, peeling or detachment occurs at the connecting materials 111 and the connecting materials 121. Furthermore, the brazing material has to be an electrically conductive material such as metal. This is because the conductivity is necessary for the connecting materials 111 and the connecting materials 121 to electrically connect respective electrode plates and current collecting plates. In addition, a material having a low electrical resistance is also preferable because its electrical energy loss is small. It is further preferable that a material has a good wettability and a good joining property with respect to the positive current collecting plate 110 and the negative current collecting plate 120, so that the connecting materials 111 and 121 after joining can provide high mechanical strength.

Next, an assembly obtained by joining the positive current collecting plate 110 and the negative current collecting plate 120 to the electrode wound body 200 is inserted in the battery container 101. An electrolytic solution is then poured into the battery container 101. After subsequent conditioning and various inspection processes, the battery 100 is completed.

According to the method of manufacturing the battery 100 in the present embodiment, as described above, the end portion PX of the positive electrode core member PB or the end portion NX of the negative electrode core member NB does not melt. Furthermore, a part of the positive current collecting plate 110 or negative current collecting plate 120 does not melt. The battery 100 manufactured in the present embodiment can therefore provide high strength in the end portion PX of the positive electrode core member PB and the end portion NX of the negative electrode core member NB.

5. Comparison with Conventional Battery

A) Comparison in Electrode Plate

Figure 7:
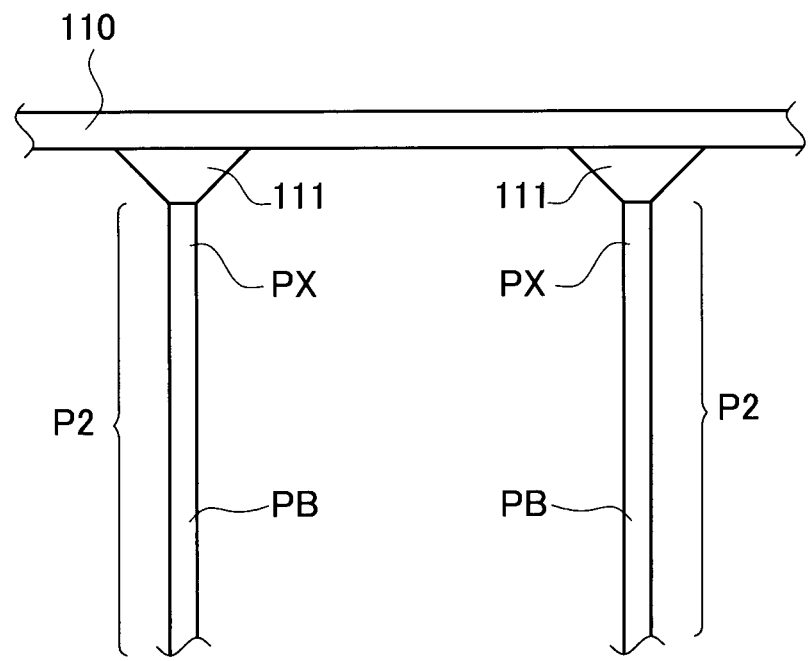
FIG. 7 is a schematic diagram to explain the connecting material for connecting the positive current collecting plate and the positive electrode core member of the battery in the embodiment.
Figure 8:
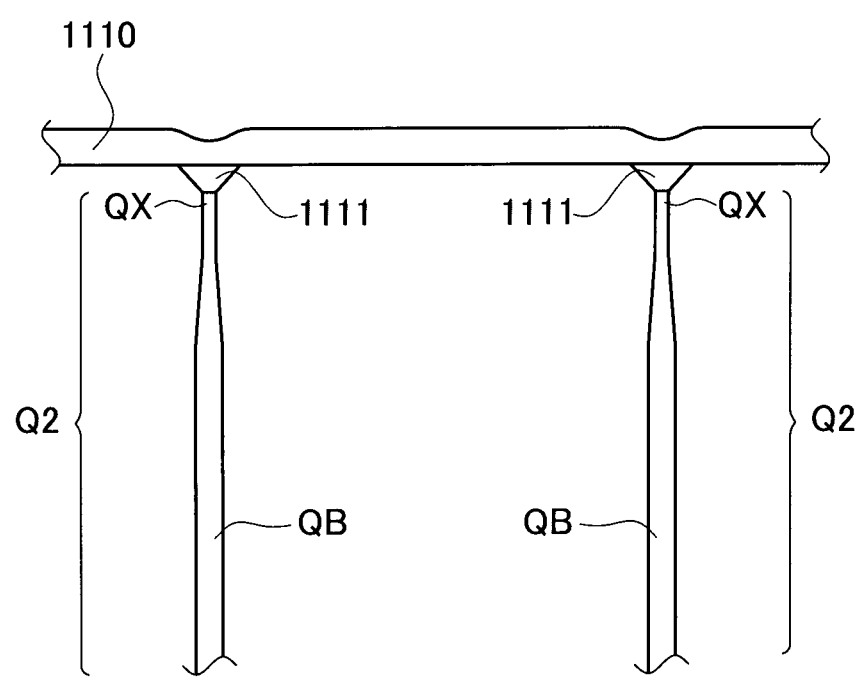
FIG. 8 is a schematic diagram to explain a connecting material for connecting a positive current collecting plate and a positive electrode core member of a conventional battery.

The following explanation is given to comparison between the battery 100 in the present embodiment and a conventional battery. This comparison is explained by exemplifying each positive-electrode connecting materials 111 and its surroundings. FIG. 7 is a schematic diagram showing only the positive current collecting plate 110 and the positive electrode core member PB of the positive electrode uncoated part P2 according to the present invention. FIG. 8 is a schematic diagram showing only a positive current collecting plate 1110 and a positive electrode plate QB of a positive electrode uncoated part Q2 in a conventional art.

Comparing between FIGS. 7 and 8, each connecting material 111 of the present invention is larger than each conventional connecting material 1111. This is because, in the present invention, a brazing material is put in advance between the positive current collecting plate 110 and the end portion PX of the positive electrode core member PB before joining them. Another reason is that the brazing material has a good wettability to the positive current collecting plate 110 and hence wet-spreads well during melting. On the other hand, when the connecting portions 1111 are heated at too high temperatures, melting regions of the positive electrode uncoated part Q2 and the positive current collecting plate 1110 become too wide to sufficiently join them. Consequently, the mechanical strength of the connecting materials 111 is higher than that of the connecting portions 1111.

The thickness of the end portion PX in the present embodiment is larger than that of a conventional end portion QX. Thus, the mechanical strength of the end portion PX on the positive electrode side of the battery 100 in the present embodiment is higher than that of the end portion QX on the positive electrode side of the conventional battery. In the conventional battery, stress tends to concentrate at the end portion QX, which is thus liable to be broken.

The electrical resistance of the end portion PX on the positive electrode side of the battery 100 in the present embodiment is lower than the electrical resistance of the end portion QX on the positive electrode side of the conventional battery. This is because the end portion PX functioning as an electrical conduction path is larger in thickness than the end portion QX. Furthermore, the battery 100 in the present embodiment is more resistant to a large amount of current than the conventional battery is. The same conditions apply to the negative electrode side.

B) Test

The thickness of an end portion of a positive electrode core member or negative electrode core member of a battery in the present embodiment and the thickness of an end portion of a positive electrode core member or negative electrode core member of the conventional battery were measured for comparison. Specifically, the thickness of the end portion PX in the embodiment shown in FIG. 7 and the conventional end portion QX shown in FIG. 8 were measured.

The positive electrode core member is an aluminum foil. The thickness of this aluminum foil before joining is 15 μm, with a thickness tolerance of ±0.9 μm. On the other hand, the negative electrode core member is a copper foil. The thickness of this copper foil before joining is 10.3 μm, with a thickness tolerance of ±0.2 μm.

Figure 9:
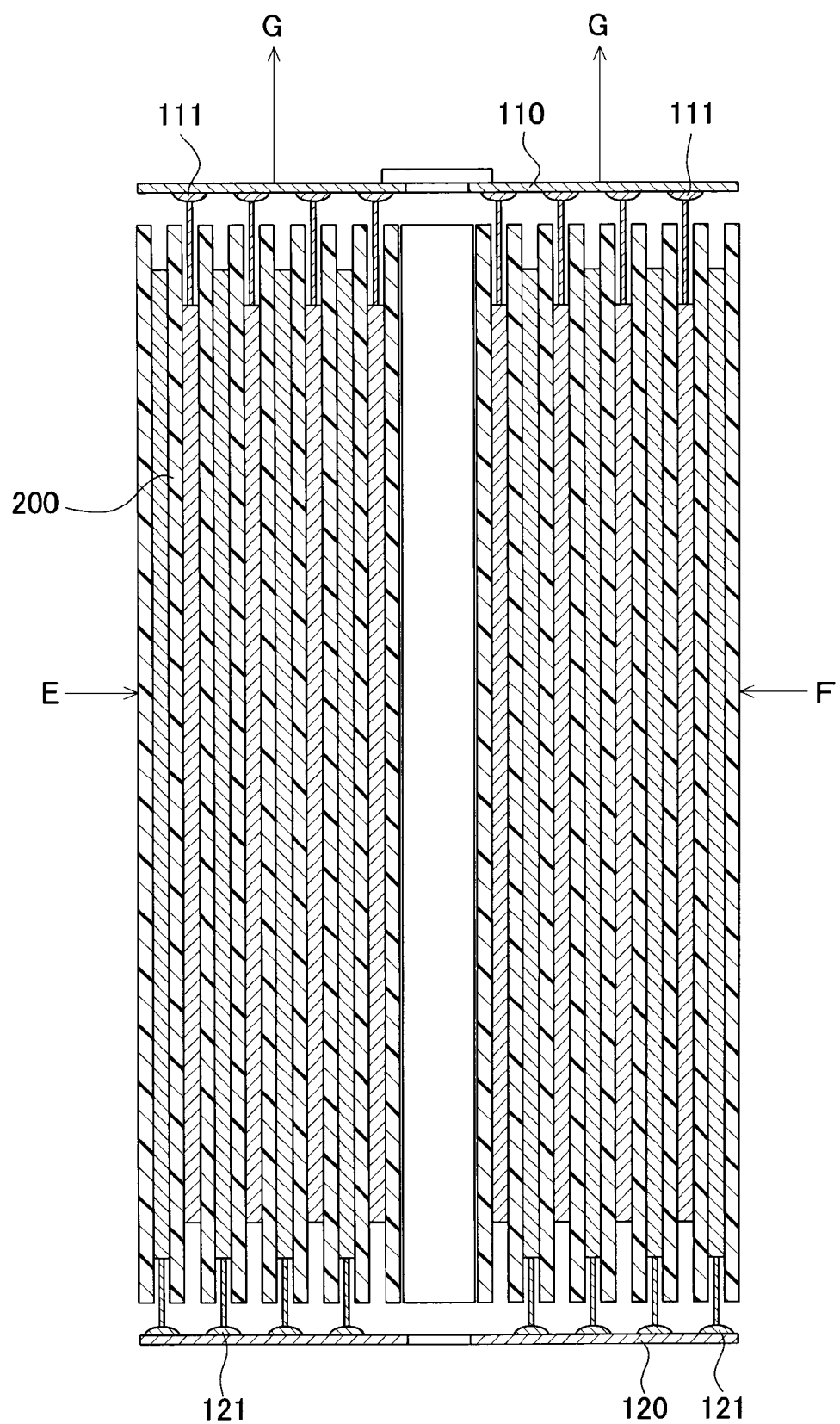
FIG. 9 is a cross sectional view to explain a method of measuring tensile strength of the connecting material of the battery in the embodiment.

In addition, the connecting material 111 of the battery in the present embodiment and the connecting portion 1111 of the conventional battery were measured for tensile strength. This measurement method is shown in FIG. 9. The electrode wound body 200 is fixed by application of forces directed as indicated by arrows E and F in FIG. 9 to the side surfaces of the electrode wound body 200. While the electrode wound body 200 is being fixed, the positive current collecting plate 110 is pulled outward, that is, in a direction indicated by arrows G in FIG. 9. At the time when the electrode wound body 200 and the positive current collecting plate 110 are separated, the force G is measured. It is to be noted that the negative electrode is subjected to the same test.

B-1. Example 1

Example 1 is a result of using BNi-6 (BS) as the brazing material for negative electrode. The thickness of the end portion NX of the negative electrode core member NB after joining was 10 µm. This 10 µm is within a range of the foil thickness tolerance, and shown in Table 3. The tensile strength was 1N per point, which is sufficient high strength.

B-2. Example 2

Example 2 is a result of using BAg-8 (BS) as the brazing material for negative electrode. The thickness of the end portion NX of the negative electrode core member NB after joining was 10 µm. This 10 µm is within the range of the foil thickness tolerance, and shown in Table 3. The tensile strength was 1N per point, which is sufficient high strength.

B-3. Example 3

Example 3 is a result of using BCuP-2 (BS) as the brazing material for negative electrode. The thickness of the end portion NX of the negative electrode core member NB after joining was 10 µm. This 10 µm is within the range of the foil thickness tolerance, and shown in Table 3. The tensile strength was 1N per point, which is sufficient high strength.

B-4. Example 4

Example 4 is a result of using Al—Si brazing filler metal (equivalent to BS A4047) as the brazing material for positive electrode. Its solidus temperature is 577° C. and liquidus line temperature is 592° C. The thickness of the end portion PX of the positive electrode core member PB after joining was 15 µm. This 15 µm is within the range of the foil thickness tolerance, and shown in Table 3. The tensile strength was 0.75N per point, which is sufficient high strength.

B-5. Example 5

Example 5 is a result of using Al—Si—Mg brazing filler metal (equivalent to JIS A4004) as the brazing material for positive electrode. Its solidus temperature is 559° C. and liquidus line temperature is 591° C. The thickness of the end portion PX of the positive electrode core member PB after joining was 15 nm. This 15 µm is within the range of the foil thickness tolerance, and shown in Table 3. The tensile strength was 0.75N per point, which is sufficient high strength.

B-6. Example 6

Example 6 is a result of using Al—Zn brazing filler metal (Soft brazing material) as the brazing material for positive electrode. Its solidus temperature is 360° C. and liquidus line temperature is 362° C. The thickness of the end portion PX of the positive electrode core member PB after joining was 15 µm. This 15 µm is within the range of the foil thickness tolerance, and shown in Table 3. The tensile strength was 0.75N per point, which is sufficient high strength.

B-7. Example 7

Example 7 is a result of using Zn—Sn brazing filler metal (Soft brazing material) as the brazing material for positive electrode. Its solidus temperature is 195° C. and liquidus line temperature is 235° C. The thickness of the end portion PX of the positive electrode core member PB after joining was 15 µm. This 15 µm is within the range of the foil thickness tolerance, and shown in Table 3. The tensile strength was 0.75N per point, which is sufficient high strength.

B-8. Comparative Example 1

Comparative Example 1 is a result of joining a negative current collecting plate and a negative electrode core member by welding instead of brazing using the brazing material for negative electrode. The thickness of the end portion (corresponding to NX) of the negative electrode core member was 4 µm to 6 µm, which is half the thickness before joining. The tensile strength was 0.35N per point, which is about half a reference value (0.75N/point).

B-9. Comparative Example 2

Comparative Example 2 is a result of joining a positive current collecting plate and a positive electrode core member by welding instead of brazing using the brazing material for positive electrode. The thickness of the end portion (corresponding to PX) of the positive electrode core member was 8 µm to 10 µm, which is half the thickness before joining. The tensile strength was 0.50N per point, which is less than the reference value (0.75N/point).

The battery in the present embodiment is shown as Examples 1-7 in Table 3. The conventional battery is shown as Comparative Examples 1 and 2 in Table 3. The tensile strength is defined as the tensile strength per joined point between an electrode current collecting plate and an electrode plate. A tensile strength required for the joined point is set to 0.75N/point or more. This value is a common value between positive electrode and negative electrode. In Table 3, the Al—Si brazing filler metal is represented as Al—Si, the Al—Si—Mg brazing filler metal is represented as Al—Si—Mg, the Al—Zn brazing filler metal is represented as Al—Zn, and the Zn—Sn brazing filler metal is represented as Zn—Sn.

TABLE 3

| | Material | | Before Brazing | After Brazing | |
| --- | --- | --- | --- | --- | --- |
| | | | Thickness of Electrode | Thickness of Electrode | |
| | Kind of Electrode | Brazing Material | Core (µm) | Core (µm) | Tensile Strength (N/point) |
| Example 1 | Negative | BNi-6 | 10 | 10 | 1 |
| Example 2 | Negative | BAg-8 | 10 | 10 | 1 |
| Example 3 | Negative | BCuP-2 | 10 | 10 | 1 |
| Example 4 | Positive | Al—Si | 15 | 15 | 0.75 |
| Example 5 | Positive | Al—Si—Mg | 15 | 15 | 0.75 |
| Example 6 | Positive | Al—Zn | 15 | 15 | 0.75 |
| Example 7 | Positive | Zn—Sn | 15 | 15 | 0.75 |
| Comparative Example 1 | Negative | None | 10 | 4-6 | 0.35 |
| Comparative Example 2 | Positive | None | 15 | 8-10 | 0.50 |

In the case of using the brazing material having a lower melting point than the melting point of the electrode core member, as described above, the thickness of the positive electrode core member (aluminum foil) and the negative electrode core member (copper foil) remains little changed even after it is joined to the positive or negative electrode current collecting plate. The thickness of the positive electrode core member after joining falls within the foil thickness tolerance (±9 µm). To be concrete, a difference between the thickness of a portion of the positive electrode core member PB after joining and the thickness of the positive electrode core member PB in the positive electrode coated part P1 falls within 12% of the thickness of the positive electrode core member PB in the positive electrode coated part P1. The thickness of the negative electrode core member after joining falls within the foil thickness tolerance (±2 µm). To be concrete, a difference between the thickness of a portion of the negative electrode core member NB after joining and the thickness of the negative electrode core member NB in the negative electrode coated part N1 falls within 3% of the thickness of the negative electrode core member NB in the negative electrode coated part N1.

6. Modified Example

Figure 10:
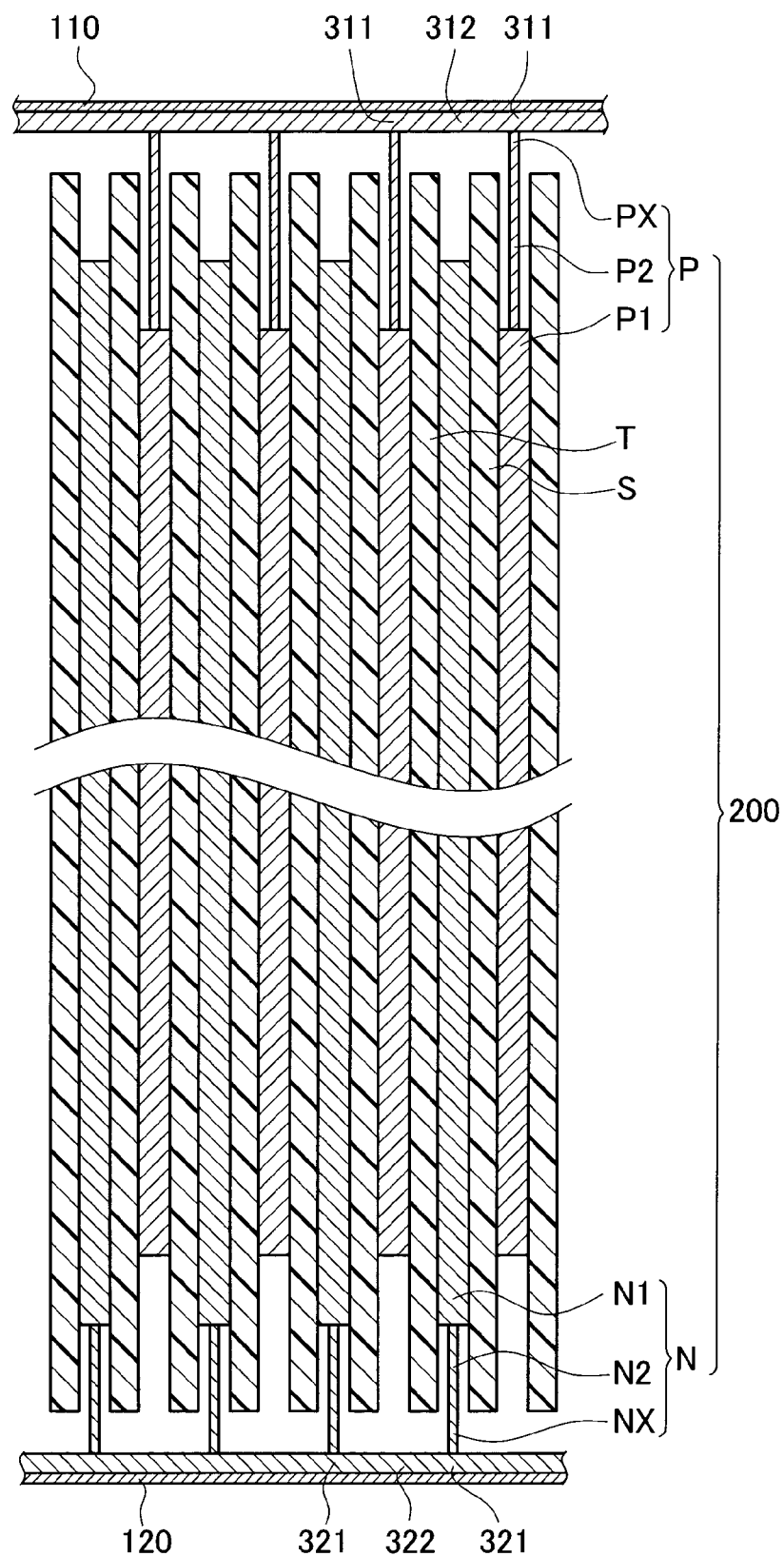
FIG. 10 is a cross sectional view (Example 2) to explain a connecting material for connecting a positive current collecting plate and a positive electrode core member or a connecting material for connecting a negative current collecting plate and a negative electrode core member of the battery in the embodiment.

A modified example in the embodiment is explained below. FIG. 10 shows the modified example in the above embodiment. In FIG. 10, the electrode wound body 200, positive current collecting plate 110, and negative current collecting plate 120 are identical to those in the above embodiment. The kinds of the brazing materials used in joining are the same as those in the embodiment. However, the shape of the brazing material used in joining is different from that in the embodiment. A connecting material 311 joining the positive electrode uncoated part P2 and the positive current collecting plate 110 is configured such that adjacent connecting materials 311 are joined to each other by bridge portions 312. Similarly, a connecting material 321 joining a negative electrode uncoated part N2 and a negative current collecting plate 120 is configured such that adjacent connecting materials 321 are joined to each other by bridge portions 322. This shape can also provide the advantageous effects of the invention.

In the above embodiment, the positive electrode core member PB and the positive current collecting plate 110 are made of aluminum. As an alternative, one or both of the positive electrode core member PB and the positive current collecting plate 110 may be made of a material other than aluminum. Even when the different material from that in the above embodiment is used, the effects of the invention can be achieved as long as the melting point of the connecting materials 111 is lower than the melting point of the positive electrode core member PB so that the positive electrode core member PB does not melt during brazing.

When brazing is to be performed by heating mainly a brazing material, such as soldering, joining can be made even when the melting point of the connecting materials 111 is lower than the melting point of the positive electrode core member PB but higher than the melting point of the positive current collecting plate. In this case, the positive electrode core member PB does not melt during brazing. During brazing, the brazing material is melted and thus the positive current collecting plate contacting the melted brazing material is partially melted to some extent or temporarily, but not entirely melted. Even in this case, the connecting materials 111 and the positive current collecting plate are sufficiently joined to each other. The positive electrode core member PB is less likely to become thin. It is however more preferable that a difference between the melting point of the connecting materials 111 and the melting point of the positive current collecting plate is small.

It is therefore preferable that the melting point of the connecting materials 111 is lower than both the melting point of the positive electrode core member PB and the melting point of the positive current collecting plate 110. This is because the positive electrode core member PB does not become thin and the positive current collecting plate 110 also does not become thin. The same applies to the negative electrode.

7. Vehicle and Device

Figure 11:
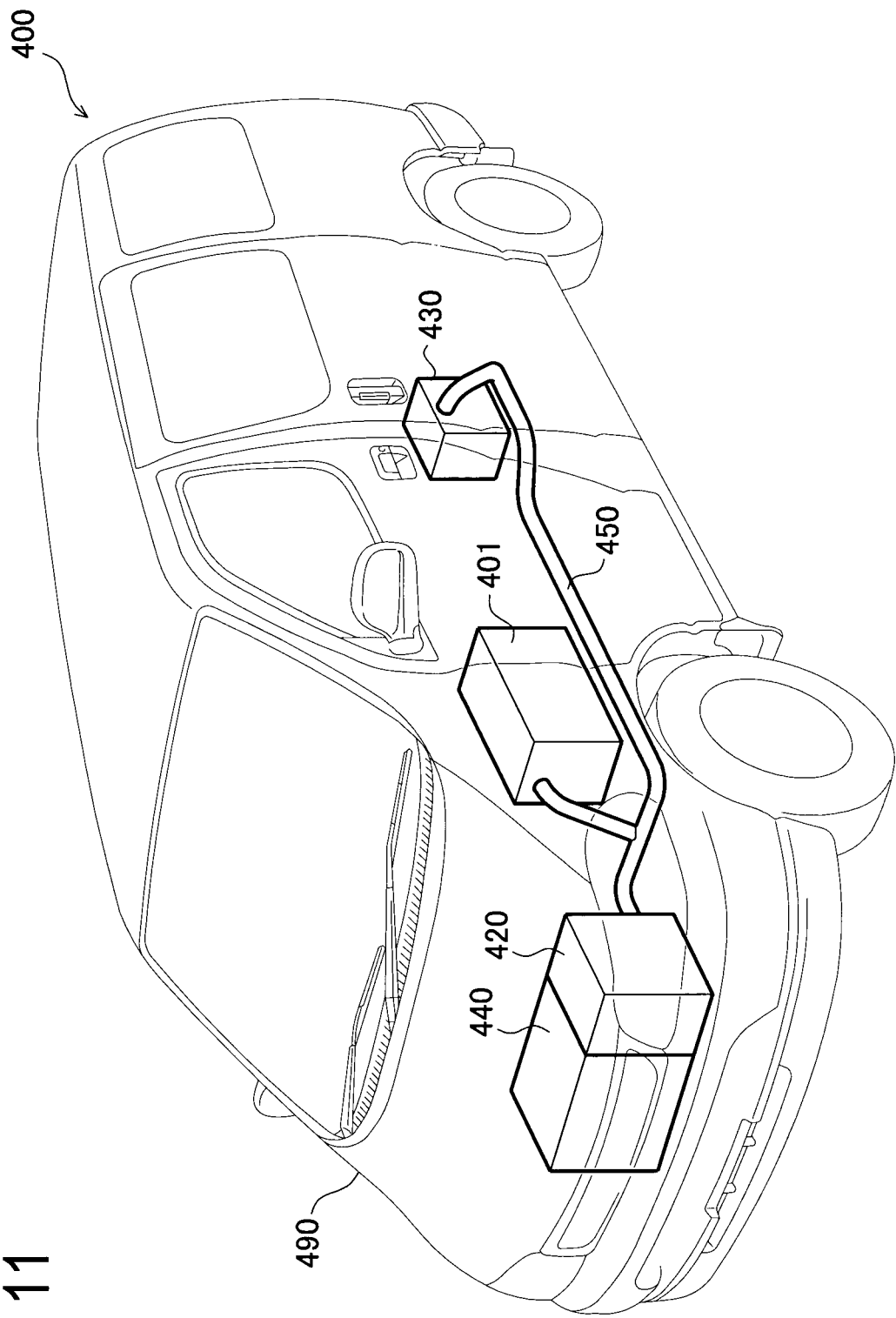
FIG. 11 is a perspective projection view to explain a vehicle in another embodiment.

The battery 100 in the embodiment can be mounted and used in for example a vehicle 400 as shown in FIG. 11. This vehicle 400 is a hybrid vehicle to be driven by a combination of an engine 440 and a motor 420. The vehicle 400 includes a vehicle body 490, the engine 440, the motor 420 attached thereto, a cable 450, an inverter 430, and a battery pack or battery assembly 401 containing a plurality of the batteries 100.

The vehicle may be any types of vehicles as long as they use electrical energy generated by batteries for part or all of their power sources, including, for example, electric cars, hybrid cars, plug-in hybrid cars, hybrid railway vehicles, fork lifts, electric wheelchairs, electric bicycles, electric scooters.

Figure 12:
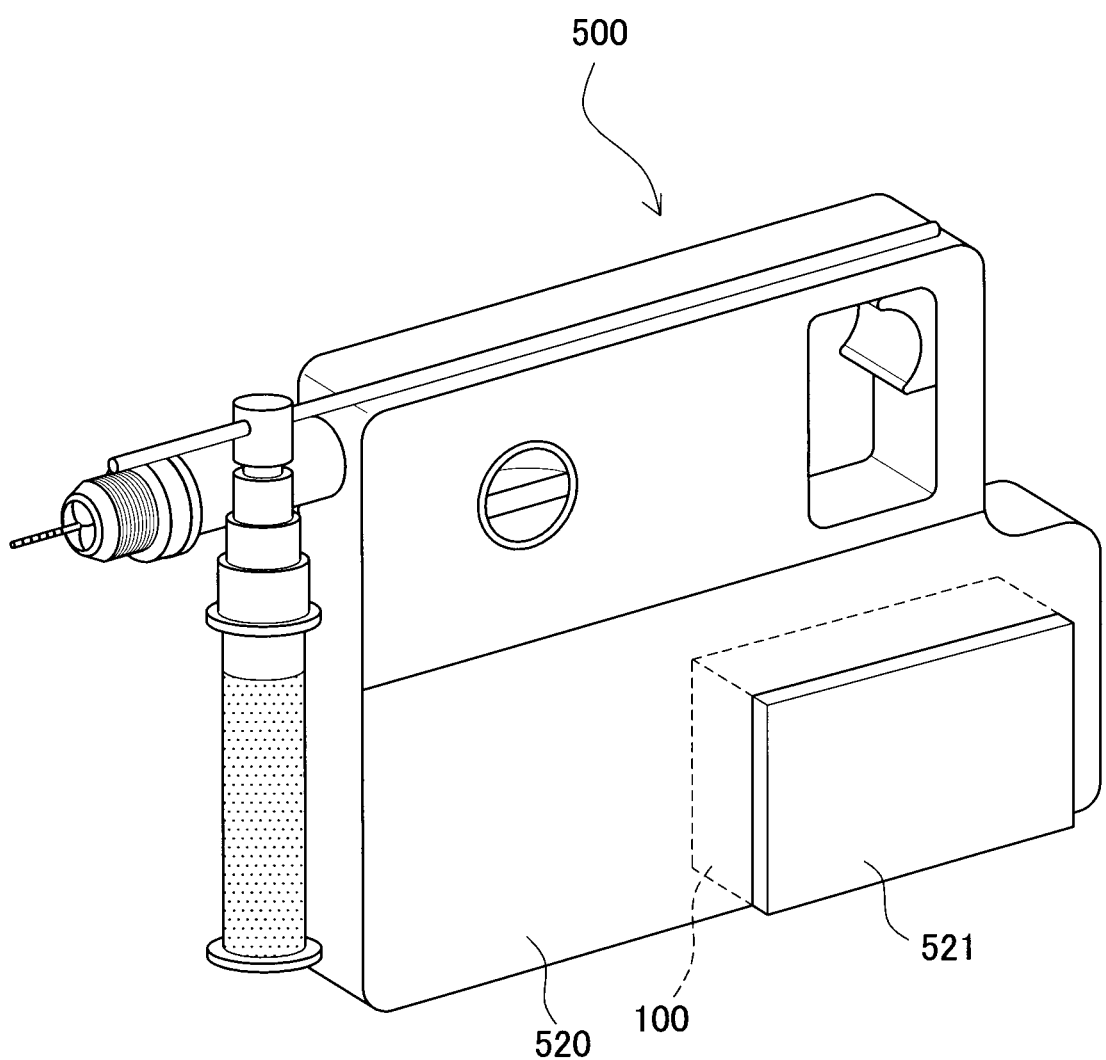
FIG. 12 is a perspective view to explain a hammer drill in another embodiment.

As another alternative, the battery 100 can be used in a battery mounting device as shown in FIG. 12. FIG. 12 shows a hammer drill 500 that mounts the battery 100 in the embodiment. This hammer drill 500 is a battery mounting device including the battery 100 and a main unit 520. The battery 100 is removably accommodated in a bottom part 521 of the main unit 520 of the hammer drill 500.

The battery mounting device may be any types of devices as long as they have a battery and utilize this battery as the whole of or part of the energy source. Examples of such devices include various battery-driven household electric appliances, office equipment, and industrial equipment, such as personal computers; cellular phones; battery-driven electric tools, permanent power supply systems. The battery mounting device also may be a device that uses the battery 100 in the form of a cell, not in the form of a battery assembly.

8. Conclusion

The battery 100 in the embodiment is configured, as explained in detail above, such that the connecting materials 111 are provided between the positive electrode core member PB of the electrode wound body 200 and the positive current collecting plate 110 and the connecting materials 121 are provided between the negative electrode core member NB and the negative current collecting plate 120. The melting point of the connecting materials 111 is lower than the melting point of the positive electrode core member PB. The melting point of the connecting materials 121 is lower than the melting point of the negative electrode core member NB.

The thickness of the positive electrode core member PB located near the connecting materials 111 is almost equal to the thickness of the positive electrode core member PB in the positive electrode coated part P1. Accordingly, the connecting materials 111 and part of the positive electrode core member PB near the connecting materials 111 provide high mechanical strength. The thickness of the negative electrode core member NB located near the connecting materials 121 is almost equal to the thickness of the negative electrode core member NB in the negative electrode coated part N1. Accordingly, the connecting materials 121 and part of the negative electrode core member NB near the connecting materials 121 provide high mechanical strength.

According to the method of manufacturing the battery in the embodiment, the end portion PX of the positive electrode core member PB or the end portion NB of the negative electrode core member NB does not melt in the course of a manufacturing process. In addition, a part of the positive current collecting plate 110 or negative current collecting plate 120 also does not melt. In the battery 100 manufactured in the embodiment, therefore, the positive electrode core member PB and the negative electrode core member NB exhibit high strength.

The embodiment is a mere example and does not particularly limit the present invention. Therefore the present invention may be embodied in other specific forms without departing from the essential characteristics thereof. For instance, the present invention is not limited to the lithium ion secondary battery, and may be applied to a non-aqueous electrolyte secondary battery or another battery.

The shape of the battery is not limited to a cylindrical shape. A rectangular shape or different shapes can achieve the same effects as above. In other words, a flat electrode body produced by press may be used. The electrode body is not limited to the wound type because any layered-type electrode body can also achieve the same effects as above if only it configured such that positive electrode plates and negative electrode plates are laminated. In this case, protruding directions of positive electrode core members and negative electrode core members are not limited to opposite directions. As long as the positive electrode core members and the negative electrode core members protrude in different directions, current collection is enabled as in the above case.

The kinds of the brazing material are not limited to the examples shown in Tables 1 and 2. Specifically, any materials having a lower melting point than the melting point of the positive electrode core member are selectable. The positive electrode plate used above is formed of the positive electrode core member both surfaces of which are applied with the positive electrode mixture layers are formed. Alternatively, the positive electrode mixture layer may be formed on only one surface. The positive current collector is not limited to the plate-like shape. These conditions are similarly applied to the negative electrode. In the present invention, the brazing may be performed by using a furnace or heating like soldering.

The invention claimed is:

1. A laminated electrode-type battery comprising:
a laminated electrode body including: a positive electrode plate in which a positive electrode core member is formed, on a part of at least one surface, with a positive electrode mixture layer; a negative electrode plate in which a negative electrode core member is formed, on a part of at least one surface, with a negative electrode mixture layer; and separators interposed between the positive electrode plate and the negative electrode plate, the positive electrode plate, negative electrode plate, and separators being laminated so that a remaining part of the positive electrode core member and a remaining part of the negative electrode core member protrude in different directions from each other;
a positive current collector joined to an end portion of the positive electrode core member protruding from the positive electrode plate of the laminated electrode body; and
a negative current collector joined to an end portion of the negative electrode core member protruding from the negative electrode plate of the laminated electrode body, wherein
the laminated electrode-type battery is a lithium ion secondary battery,
the laminated electrode-type battery comprises:
a positive electrode connecting material that connects the end portion of the positive electrode core member and a plate surface of the positive current collector; and
a negative electrode connecting material that connects the end portion of the negative electrode core member and a plate surface of the negative current collector,
a melting point of the positive electrode connecting material is lower than a melting point of the positive electrode core member,
a melting point of the negative electrode connecting material is lower than a melting point of the negative electrode core member,
the positive electrode core member is made of aluminum,
the negative electrode core member is made of copper,
the positive electrode connecting material is made of a brazing material selected from Al—Si-based brazing material, Al—Si—Mg-based brazing material, Al—Zn-based brazing material, and Zn—Sn-based brazing material, and
the negative electrode connecting material is made of a brazing material selected from Ni-based brazing material, Ag-based brazing material, and Cu-based brazing material.

2. The laminated electrode-type battery according to claim 1, wherein
the melting point of the positive electrode connecting material is lower than a melting point of the positive current collector, and
the melting point of the negative electrode connecting material is lower than a melting point of the negative current collector.

3. The laminated electrode-type battery according to claim 2, wherein
the positive current collector is made of aluminum, and
the negative current collector is made of copper.

4. The laminated electrode-type battery according to claim 1, wherein a non-aqueous electrolyte is provided between the positive electrode plate and the negative electrode plate.

5. The laminated electrode-type battery according to claim 1, wherein a difference between the thickness of the end portion of the positive electrode core member and the thickness of a portion of the positive electrode core member on which the positive electrode mixture layer is formed is in a range of 12% of the thickness of the portion of the positive electrode core member on which the positive electrode mixture layer is formed.

6. The laminated electrode-type battery according to claim 1, wherein a difference between the thickness of the end portion of the negative electrode core member and the thickness of a portion of the negative electrode core member on which the negative electrode mixture layer is formed is in a range of 3% of the thickness of the portion of the negative electrode core member on which the negative electrode mixture layer is formed.

7. A vehicle that mounts the laminated electrode-type battery according to claim 1.

8. A device that mounts the laminated electrode-type battery according to claim 1.

9. A method of manufacturing a laminated electrode-type battery, in which a laminated electrode body is produced by laminating a positive electrode plate in which a part of at least one surface of a positive electrode core member is formed with a positive electrode mixture layer, a negative electrode plate in which a part of at least one surface of a negative electrode core member is formed with a negative electrode mixture layer, and separators interposed between the positive electrode plate and the negative electrode plate, so that a remaining part of the positive electrode core member and a remaining part of the negative electrode core member protrude in different directions from each other;
an end portion of the negative electrode core member protruding from the negative electrode plate of the laminated electrode body is joined to a plate surface of a negative current collector with a negative electrode connecting material, and
an end portion of the positive electrode core member protruding from the positive electrode plate of the laminated electrode body is joined to a plate surface of a positive current collector with a positive electrode connecting material, wherein
the laminated electrode-type battery is a lithium ion secondary battery,
the positive electrode core member is made of aluminum,
the negative electrode core member is made of copper,
wherein a brazing material for positive electrode which has a lower melting point than a melting point of the positive electrode core member, the brazing material for positive electrode being one of Al—Si-based brazing material, Al—Si—Mg-based brazing material, Al—Zn-based brazing material, and Zn—Sn-based brazing material is used as the positive electrode connecting material, and
a brazing material for negative electrode which has a lower melting point than a melting point of the negative electrode core member, the brazing material for negative electrode being one of Ni-based brazing material, Ag-based brazing material, and Cu-based brazing material is used as the negative electrode connecting material.

10. The method of manufacturing a laminated electrode-type battery according to claim 9, wherein
the brazing material for positive electrode is a brazing material having a melting point lower than a melting point of the positive current collector, and
the brazing material for negative electrode is a brazing material having a melting point lower than a melting point of the negative current collector.

11. The laminated electrode-type battery according to claim 1, wherein the melting point of the negative electrode connecting material is higher than the melting point of the positive electrode core member.

12. The laminated electrode-type battery according to claim 11, wherein the melting point of the negative electrode connecting material is higher than the melting point of the positive current collector.

13. The method of manufacturing a laminated electrode-type battery according to claim 9, wherein
the positive electrode core member is joined to the positive current collector after the negative electrode core member is joined to the negative current collector, and
the brazing material for negative electrode is a material having a melting point higher than a melting point of the positive electrode core member.

14. The method of manufacturing a laminated electrode-type battery according to claim 13, wherein the brazing material for negative electrode is a material having a melting point higher than a melting point of the positive current collector.

* * * * *